United States Patent
Park et al.

(10) Patent No.: US 7,637,986 B2
(45) Date of Patent: Dec. 29, 2009

(54) PROCESS FOR REFINING NITROGEN TRIFLUORIDE GAS USING ALKALI EARTH METAL EXCHANGED AND IMPREGNATED ZEOLITE

(75) Inventors: Yong-Chul Park, Seongnam-si (KR); Woo-Sik Jeong, Seoul (KR); Kwang-Chul Hyun, Anyang-si (KR); Jang-Won Lee, Anyang-si (KR); Ik-Hyeon Kwon, Seoul (KR)

(73) Assignee: Hyosung Corporation, Seoul (KR)

( * ) Notice: Subject to any disclaimer, the term of this patent is extended or adjusted under 35 U.S.C. 154(b) by 385 days.

(21) Appl. No.: 11/631,658

(22) PCT Filed: Jul. 7, 2005

(86) PCT No.: PCT/KR2005/002179

§ 371 (c)(1),
(2), (4) Date: Jan. 5, 2007

(87) PCT Pub. No.: WO2006/006792

PCT Pub. Date: Jan. 19, 2006

(65) Prior Publication Data

US 2008/0087166 A1   Apr. 17, 2008

(30) Foreign Application Priority Data

| Jul. 8, 2004 | (KR) | ...................... 10-2004-0053044 |
| Jul. 8, 2004 | (KR) | ...................... 10-2004-0053047 |
| Jul. 8, 2004 | (KR) | ...................... 10-2004-0053049 |

(51) Int. Cl.
*B01D 53/02* (2006.01)

(52) U.S. Cl. .................. 95/131; 95/900; 423/240 S
(58) Field of Classification Search ............... 96/108, 96/153; 95/128, 131, 148, 900, 902; 423/716, 423/717, 239.2, 240 S, 406; 500/60; 502/60
See application file for complete search history.

(56) References Cited

U.S. PATENT DOCUMENTS

| 4,193,976 | A | * | 3/1980 | Lileck et al. ............... 423/406 |
| 4,933,158 | A | * | 6/1990 | Aritsuka et al. ............ 423/210 |
| 4,948,571 | A | * | 8/1990 | Harada et al. ............ 423/240 S |
| 5,053,372 | A | * | 10/1991 | Brownscombe ............. 502/60 |
| 5,069,690 | A |   | 12/1991 | Henderson et al. |
| 5,069,887 | A |   | 12/1991 | Suenaga et al. |
| 5,976,222 | A |   | 11/1999 | Yang et al. |
| 6,187,077 | B1 |   | 2/2001 | Li |
| 7,384,618 | B2 | * | 6/2008 | Singh et al. ............... 423/406 |
| 2001/0049998 | A1 | * | 12/2001 | Rode et al. .................. 95/117 |
| 2003/0029314 | A1 | * | 2/2003 | Nakamura et al. ............ 95/117 |
| 2003/0221556 | A1 |   | 12/2003 | Igumnov et al. |

FOREIGN PATENT DOCUMENTS

JP   7-132211   5/1995

* cited by examiner

*Primary Examiner*—Frank M Lawrence
(74) *Attorney, Agent, or Firm*—Dickstein Shapiro LLP

(57) ABSTRACT

Disclosed herein are a process for the refinement of nitrogen trifluoride gas and an adsorbent therefor. A nitrogen trifluoride (NF3) gas including carbon tetrafluoride (CF4) as an impurity is permeated into a bed of zeolite 3A, 4A or 5A which undergoes ion exchange and impregnation with alkali earth metal and is thermally treated at 150 to 600° C. for 0.5 to 100 hours so as to be able to selectively adsorb nitrogen trifluoride onto the bed, followed by the desorption of the nitrogen trifluoride therefrom.

10 Claims, No Drawings

PROCESS FOR REFINING NITROGEN TRIFLUORIDE GAS USING ALKALI EARTH METAL EXCHANGED AND IMPREGNATED ZEOLITE

TECHNICAL FIELD

The present invention relates, in general, to the refinement of nitrogen trifluoride (NF3) gas and, more particularly, to a process for refining nitrogen trifluoride gas by the removal of carbon tetrafluoride (CF4) therefrom.

BACKGROUND ART

In the semiconductor industry, nitrogen trifluoride has a variety of applications, including as a fluorine source for plasma etch, a cleaning agent for CVD reactors, and a dry etchant for semiconductors. Besides, nitrogen trifluoride is useful as a rocket fuel. With the development of the semiconductor industry, the nitrogen trifluoride gas has been in great demand. The increasing demand for a gas without any environmental pollution increased the demand for the nitrogen triflurode gas by geometric progression. As a matter of course, nitrogen trifluoride gas for use in these applications is required to be of high purity.

Nitrogen trifluoride can be prepared by various methods, including the direct fluoridation of ammonia, the use of plasma to react ammonia with fluorine, and molten salt electrolysis for electrolyzing NH4.xHF (x: 1.8~2.1) with ammonium fluoride or hydrogen fluoride used as a material.

In most cases when using these methods, impurities, such as nitrous oxide (N2O), carbon dioxide (CO2), carbon tetrafluoride (CF4), dinitrogen difluoride (N2F2), etc., are concurrently produced in large amounts, so that purification is necessary to obtain highly pure NF3 gas suitable for use in the semiconductor industry.

Particularly, CF4, produced as an impurity upon the production of NF3, is difficult to be removed from NF3 by general methods such as distillation, bulk adsorption, etc., because of the similarities therebetween in boiling point, molecular size, and heat of adsorption. On the other hand, carbon tetrafluoride, even if present in a trace amount, causes troubles in semiconductor etching because it forms solid residues such as carbon or silicon carbide.

U.S. Pat. No. 5,069,887, yielded to Takashi et al., discloses a method of refining nitrogen trifluoride gas using synthetic zeolite in removing carbon tetrafluoride. In the method, zeolite 5A containing 1 to 10% by weight of crystallization water is used as an adsorbent to give nitrogen trifluoride with a carbon tetrafluoride content of 10 ppm or less, which meets the requirements of the electronic industry. This method, however, is disadvantageous in that the water content of the synthetic zeolite must be adjusted to within a predetermined range and the adsorption temperature range is very narrow.

Another refining method using synthetic zeolite can be found in U.S. Pat. No. 5,069,690, yielded to Philip et al., which discloses the kinetic gas-solid chromatography. In this method, hydrothermally treated zeolite having a certain porosity is used as an adsorbent, and discrete pulses of a mixture of gases are passed through a bed of the porous adsorbent that kinetically adsorbs one gas more readily than the other gases, resulting in the selective separation of NF3 gas. However, the hydrothermal pre-treatment for controlling the porosity of zeolite is difficult to conduct. In addition, the available time period of the zeolite, that is, the saturation time period, is too short to apply the zeolite method in the commercialized mass purification of nitrogen trifluoride.

DISCLOSURE OF INVENTION

Technical Problem

Leading to the present invention, intensive and thorough research on the refinement of NF3, conducted by the present inventors, resulted in the finding that when ion-exchanged and impregnated with alkali earth metal, zeolite 3A, 4A or 5A can be effective as a molecular sieve for selectively adsorbing NF3 from a mixture of NF3 and CF4.

Technical Solution

The present invention pertains to a process for refining NF3 gas using zeolite 3A ion-exchanged and impregnated with alkali earth metal and the zeolite 3A, 4A or 5A ion-exchanged and impregnated with alkali earth metal used therein.

Commercially available zeolite 3A, 4A and 5A cannot themselves be used to purify NF3 because they cannot discriminate between NF3 and CF4 in adsorption. Both zeolite 3A and 4A have small pore sizes so as to adsorb neither NF3 nor CF4 sufficiently, while the pore size of zeolite 5A is large enough to adsorb both NF3 and CF4. Accordingly, the selective adsorption only of NF3 requires that the adsorbent have a pore size smaller than the molecular size of CF4 but larger than the molecular size of NF3.

Changing the pore size of zeolite can be achieved using ion exchange or impregnation with metal cations. The present invention features the ion exchange and impregnation of zeolite 3A, 4A or 5A with an appropriate amount of alkali earth metal to modify the pore size of the zeolite. That is, the pore size of zeolite 3A, 4A or 5A is adjusted by ion exchange with alkali earth metal to a predetermined size and then further finely controlled by impregnation with metal.

Generally, ion exchange, used in the present invention, is widely used to load metal components onto a support such as silica, silica-alumina, zeolite, etc. In particular, the suitability of zeolite for cation exchange is useful for the loading of metal ions thereonto. The cations of zeolite can be exchanged with other cations according to the kinds of ion and concentrations of solution. In addition to being useful in separating metal ions, the cation exchange capacity of zeolite is a measure for controlling the acidity of zeolite and introducing metal ions thereinto. Typically, zeolite type A is synthesized with sodium ions employed as cations. Zeolite type A with sodium ions serving as cations has an effective pore size of approximately 0.4 nm (type 4A). The effective pore size is changed to 0.3 nm (type 3A) when potassium ions serve as cations and 0.5 nm (type 5A) when calcium ions serve as cations. On zeolite, cations can be exchanged with other types according to the kinds of cations and the concentration of solutions. When loaded by ion exchange, active materials can be very homogeneously distributed over the support.

Impregnation is a method of loading an active component onto a support by contacting the support with a solution containing the active component. According to contact techniques, there are adsorption, spray, evaporative drying, and incipient wetness methods. In an adsorption method, a support is immersed in a solution containing an active component so that the active component is adsorbed onto the surface of the support. An evaporative drying method is generally accomplished by immersing a support in a solution containing an active component and evaporating the solution to fix the active component onto the support. Caution must be taken when using this method because a large impregnated amount of the active component may clog up fine pores of the support. As for a spray method, it is one kind of evaporative drying method and comprises spaying a solution containing an active component onto a support which is being shaken or stirred in an evaporator. By the spray method, the active component is impregnated more into surfaces of the support than into pores of the support. According to an incipient wetness method, a solution of an active component in a solvent having the same volume as pores of a support is adsorbed onto the support, followed by the removal of the solvent by drying.

In accordance with the present invention, a process is provided for refining nitrogen trifluoride by selectively removing CF4 therefrom, in which a mixture of carbon tetrafluoride and nitrogen trifluoride is introduced into a column filled with zeolite ion-exchanged and impregnated with alkali earth metal so that nitrogen trifluoride is selectively adsorbed onto and desorbed from the zeolite while carbon tetrafluoride passes through the column.

ADVANTAGEOUS EFFECTS

The process according to the present invention can effectively produce nitrogen trifluoride of high purity, by the removal of CF4.

BEST MODE FOR CARRYING OUT THE INVENTION

Below, a detailed description of the present invention will be given.

Zeolite used in the present invention is Zeolite 3A, 4A or 5A. In order to make their pore sizes suitable for selective filtration only of NF3, the zeolite is subjected to ion exchange with alkali earth metal, and then subjected to impregnation with alkali earth metal. Here, the alkali earth metal for the ion exchange and for the impregnation can be the same or different, preferably the same.

Alkali earth metal suitable for the ion exchange and the impregnation of the zeolite is one or more of beryllium (Be), magnesium (Mg), calcium (Ca), strontium (Sr) or barium (Ba). To be used for the ion exchange according to the present invention, the precursors of the alkali earth metal must be soluble in water, preferably the precursors are nitrate (NO3), carbonate (CO3), chloride (Cl), hydroxide (OH) and sulfate (SO4) of the alkali earth metal or their hydrates.

Examples of suitable beryllium precursors include beryllium nitrate hydrate (Be(NO3)2.xH2O), beryllium chloride (BeCl2), beryllium sulfate tetrahydrate (BeSO4.4H2O), etc., with preference for beryllium chloride (BeCl2).

Examples of suitable magnesium precursors include magnesium nitrate hexahydrate (Mg(NO3)2.6H2O), magnesium carbonate hydroxide pentahydrate (MgCO3.Mg(OH)2.5H2O), magnesium chloride (MgCl2), magnesium chloride hexahydrate (MgCl2.6H2O), magnesium hydroxide (Mg(OH)2), magnesium sulfate (MgSO4), magnesium sulfate monohydrate (MgSO4.H2O), magnesium sulfate heptahydrate (MgSO4.7H2O), etc. with preference given to magnesium chloride hexahydrate (MgCl2.6H2O).

Suitable calcium precursors may be exemplified by calcium nitrate hydrate (Ca(NO3)2.xH2O), calcium carbonate (CaCO3), calcium chloride (CaCl2), calcium chloride dihydrate (CaCl2.2H2O), calcium chloride hexahydrate (CaCl2.6H2O), calcium chloride hydrate (CaCl2.xH2O), calcium hydroxide (Ca(OH)2), calcium sulfate (CaSO4), and calcium sulfate hexahydrate (CaSO4.6H2O), with calcium chloride hexahydrate (CaCl2.6H2O) being preferred.

Suitable strontium precursors may be exemplified by strontium nitrate (Sr(NO3)2), strontium carbonate (SrCO3), strontium chloride (SrCl2), strontium chloride hydrate (SrCl2.xH2O), strontium hydroxide (Sr(OH)2), strontium hydroxide octahydrate (Sr(OH)2.8H2O), and strontium sulfate (SrSO4), with strontium chloride hydrate (SrCl2.xH2O) being preferred.

Examples of suitable barium precursors include barium nitrate (Ba(NO3)2), barium carbonate (BaCO3), barium chloride (BaCl2), barium chloride dihydrate (BaCl2.2H2O), barium hydroxide (Ba(OH)2), barium hydroxide monohydrate (Ba(OH)2.H2O), barium hydroxide octahydrate (Ba(OH)2.8H2O), barium sulfate (BaSO4), etc., with preference for barium chloride dihydrate (BaCl2.2H2O).

To be used for the preparation of ion-exchanged and impregnated zeolite, an aqueous solution contains a precursor of the metal to be ion-exchanged in a concentration of 0.01 to 3M, preferably in a concentration of 0.5 to 1.5M. For example, when the aqueous solution containing the metal to be ion-exchanged is below 0.01M, sufficient ion-exchange cannot be realized. On the other hand, when the concentration of the aqueous solution exceeds 3M, the zeolite does not further increase in ion exchange capacity with the increase in the concentration.

In the aqueous solution, zeolite is ion-exchanged with the metal at 35 to 100° C., and preferably at 50 to 80° C., for 0.5 to 24 hours, preferably 2 to 12 hours, while being stirred at a speed of 5 to 100 rpm preferably at a speed of 10 to 50 rpm. After the ion exchange, the zeolite contains an alkali earth metal therein preferably in an amount of 20 to 95% by weight based on the weight of the total metal of the zeolite.

In addition to the ion exchange with alkali earth metal, impregnation with alkali earth metal is carried out on the zeolite. For this purpose, an aqueous solution containing a desired amount of an alkali earth metal which is to be impregnated is prepared using the above precursor. Then, the zeolite ion-exchanged with alkali earth metal is immersed in the above aqueous solution and allowed to stand at room temperature, followed by drying the zeolite for 0.5 to 24 hours, preferably for 2 to 10 hours, in an evaporator. This impregnation can adjust the pore size of zeolite 3A to a desired size. The amount of the alkali earth metal impregnated is preferably on the order of 0.1 to 5% by weight based on the total weight of the zeolite.

Zeolite used in the present invention is spherical with a particle size ranging from 4 to 100 meshes, and preferably from 8 to 40 meshes. After being ion-exchanged with alkali earth metal, the zeolite having such particle sizes is thermally treated at 150 to 600° C., preferably at 200 to 500° C., for 0.5 to 100 hours, preferably 2 to 50 hours, and more preferably 4 to 20 hours.

The thermal treatment in that temperature range makes the zeolite useful as an adsorbent that has an adsorption capacity sufficient to achieve the object of the present invention. For example, if the thermal treatment is conducted at a temperature below 150° C., the zeolite, even if treated for a long period of time, sharply decreases in adsorption capacity immediately after operation, and thus has a very small amount of nitrogen trifluoride adsorbed thereonto. This is believed to be attributed to the fact that, upon treatment at a temperature below 150° C., moisture drops inside the zeolite occupy most positions onto which nitrogen trifluoride molecules can be adsorbed, deteriorating the NF3 absorption capacity per unit volume of zeolite. In order to substantially dehydrate the zeolite, accordingly, the thermal treatment is preferably conducted at a temperature higher than 150° C.

On the other hand, a thermal treatment temperature higher than 600° C. gives rise to a change in the crystalline structure of zeolite or breaks the pores of the zeolite, greatly deteriorating the adsorption capacity of the zeolite. As a result, the zeolite suffers from the problem of being unable to adsorb nitrogen trifluoride, or of reaching adsorption saturation within a short time after gas permeation.

Preferably, the thermal treatment of zeolite is conducted in the presence of flowing inert gas which is substantially free of moisture, such as nitrogen, helium, neon, argon, xenon, etc. Also, the thermal treatment may be carried out under reduced pressure with suction of the inert gas.

One method for the thermal treatment, in detail, is that zeolite particles having a desired size distribution are laid in a thin layer on the bottom of a dryer and are heated, with an inert gas flowing over the thin zeolite particle layer. However, it is preferred that the thermal treatment and the adsorption and purification of nitrogen trifluoride gas be performed in one vessel. That is, most preferable method is that after being formed in a vessel or column, a bed of zeolite particles having an appropriate size distribution is thermally treated with a flow of inert gas therethrough, then the zeolite is cooled without being withdrawn out of the vessel or column, and a gas mixture including nitrogen trifluoride is introduced into the bed of zeolite particles. The vessel or column may be made from a conventional material, such as stainless steel, copper, nickel, iron, etc.

As described above, the zeolite, after completion of the thermal treatment, is allowed to cool spontaneously or is subjected to forcible cooling to room temperature (25° C.) or lower. Upon cooling, the incorporation of moisture into zeolite particles must be avoided.

In accordance with the present invention, the refinement of nitrogen trifluoride is achieved in the following four steps using the pretreated synthetic zeolite.

First, a mixture gas of nitrogen trifluoride and carbon tetrafluoride is introduced into a column filled with thermally pretreated zeolite 3A, 4A or 5A ion-exchanged and impregnated with alkali earth metal so as to adsorb NF3 onto the zeolite molecular sieve.

Upon the permeation of the gas mixture including nitrogen trifluoride, the column is preferably in a temperature range from −100 to 50° C., preferably from −50 to 30° C. The more preferable for gas permeation are the lower temperatures, but since practical operation is impossible at a temperature below −129° C., the boiling point of NF3, refinement is conducted at −100° C. or higher. At higher than 50° C., unnecessary heat supply is required.

For the permeation of the mixture gas including nitrogen trifluoride, inert gas may serve as a carrier. Any gas, as long as it does not react with NF3 or zeolite, may be used. Examples of the inert gas that can be used along with the target mixture gas include nitrogen, helium, neon, argon, and xenon. The inert gas is preferably used in an amount of 20 to 80 vol % based on the total volume of NF3, CF4 and the inert gas introduced.

As for the zeolite bed, it preferably has a diameter of 1 to 50 cm and a height of 5 to 200 cm. Upon the permeation of the gas mixture through the zeolite bed, the gas mixture preferably flows at a rate of 1 to 25 $g/cm^2 \cdot hr$ at a pressure of 1 to 10 $kg/cm^2$. In accordance with the present invention, the NF3 gas obtained by the refinement process has a CF4 content of 0 to 30 ppm.

Second, the selectively adsorbed NF3 is collected using a purging process. The zeolite is purged with inert gas. To this end, inert gas is passed through the zeolite bed at a mass flow rate of 1 to 100 $g/cm^2 \cdot hr$, and preferably at a mass flow rate of 30 to 60 $g/cm^2 \cdot hr$. Any gas, as long as it is nonreactive with NF3 and zeolite, may be used for the collection of NF3 and zeolite, exemplified by nitrogen, helium, neon, argon and xenon. The mass flow rate is defined as linear velocity multiplied by fluid density (linear velocity×fluid density). A path with a constant cross sectional area is convenient particularly when treating gas because the mass flow rate is maintained constant even if the linear velocity varies upon heating/cooling during the purging process.

In the purging process, the zeolite is preferably maintained at a temperature of −30 to 50° C., preferably of 20 to 30° C. If the temperature is too low, it takes too much time to complete the purging process. On the other hand, too high temperature may allow impurities chemically bound to the adsorbent, so that it can be desorbed therefrom during purging process and deteriorate the purity of the resulting NF3 gas.

Third, the adsorbent is regenerated through a temperature elevation and desorption process in which impurities remaining in a small amount within the adsorbent are completely removed. If the adsorption-purge processes are repeated without the temperature elevation and desorption, the adsorbent decreases further in adsorption capacity every round of adsorption. Therefore, the temperature elevation and desorption process is essential.

The temperature elevation is conducted at a rate of 0.1 to 20° C./min, and preferably at a rate of 1 to 5° C./min, up to 500° C., and preferably 200° C., using flowing air or inert gas.

Finally, when the NF3 gas obtained after the collection process is measured to have an impurity content higher than a predetermined standard, the first to third steps are repeated.

Mode for the Invention

A better understanding of the present invention may be obtained through the following examples which are set forth to illustrate, but are not to be construed as the limit of the present invention.

Preparation Example 1

Zeolite 3A (commercially available from Aldrich. Inc., particle size 8-12 meshes, spherical) was slowly added to a IM solution of a precursor of alkali earth metal in distilled water and mixed. The suspension was allowed to react for 6 hours at 80° C. with slow stirring, followed by recovering the zeolite 3A through filtration. Thereafter, the zeolite 3A was dried at 130° C. for 6 hours in an oven and then baked at 500° C. for 12 hours to yield zeolite 3A whose metal was ion-exchanged with an alkali earth metal in an amount of 50% by weight. To an aqueous solution of the same alkali earth metal precursor was slowly added the alkali earth metal-ion-exchanged zeolite which was then allowed to stand at room temperature for 4 hours. The content of the alkali earth metal precursor in the aqueous solution was controlled such that the alkali earth metal was impregnated into the zeolite in an amount of 1% by weight based on the total weight of the zeolite. After the evaporation of the remaining solvent by heating, the resulting zeolite was dried at 130° C. for 6 hours and then baked at 500° C. for 12 hour. The zeolite 5A ion-exchanged and impregnated with alkali earth metal was analyzed for metal content. The results are given in Table 1, below.

Preparation Example 2

The same procedure as in Preparation Example 1 was performed, with the exception of using zeolite 4A instead of zeolite 3A. The zeolite 4A ion-exchanged and impregnated with alkali earth metal was analyzed for metal content. The results are given in Table 2, below.

Preparation Example 3

The zeolite 4A that was ion-exchanged with alkali earth metal in an amount of 50% by weight in Preparation Example 2 was impregnated with the same alkali earth metal. In this regard, solutions of a precursor of the alkali earth metal were prepared such that the impregnated amounts of the alkali earth metal was 0.1, 0.5 and 1.5% by weight based on the total weight of the zeolite. Through impregnating with the solutions, the zeolite 4A ion-exchanged and impregnated with alkali earth metal was obtained. The results are given in Table 2, below.

Preparation Example 4

The zeolite 4A which was ion-exchanged with alkali earth metal in an amount of 80% by weight was impregnated with the same alkali earth metal in amounts of 0.1, 0.5, 1 and 1.5% by weight, respectively, in a manner similar to that of Preparation Example 1. Results are given in Table 3, below.

Preparation Example 5

The same procedure as in Preparation Example 1 was carried out, with the exception that zeolite 5A was used instead of zeolite 3A, to yield zeolite 5A ion-exchanged and impregnated with alkali earth metal. The results are given in Table 4, below.

Preparation Example 6

The same zeolite 5A that was ion-exchanged with alkali earth metal in an amount of 50% by weight in Preparation Example 5 was impregnated with the same alkali earth metal. In this regard, solutions of a precursor of the alkali earth metal were prepared such that the impregnated amounts of the alkali earth metal were 0.1, 0.5 and 1.5% by weight based on the total weight of the zeolite. Through impregnating with the solutions, the zeolite 5A ion-exchanged and impregnated with alkali earth metal was obtained. The results are given in Table 4, below.

Preparation Example 7

The zeolite 5A which was ion-exchanged with alkali earth metal in an amount of 80% by weight was impregnated with the same alkali earth metal in amounts of 0.1, 0.5, 1 and 1.5% by weight, respectively, in a manner similar to that of Preparation Example 1. Properties of the zeolite 5A ion-exchanged and impregnated with alkali earth metal, thus obtained, are given in Table 5, below.

Example I

After being filled to a height of 400 mm in a stainless steel column having an inner diameter of 10 mm, the zeolite 3A ion-exchanged and impregnated with alkali earth metal in Preparation Example 1 was thermally treated for 6 hours at 300° C. in an inert gas atmosphere. Next, the zeolite particle bed was cooled down to −20° C. and a gas mixture of inert gas, NF3 and CF4 (inert gas 50 vol %, NF3 49.75 vol %, CF4 0.25 vol %) was allowed to permeate through the zeolite bed at a weight flow rate of 22.5 (g/cm$^2$·hr) until NF3 was sufficiently adsorbed thereonto (about 3 hours). Subsequently, cooled at a rate of 5° C./min until it reaches 30° C., the zeolite bed was purged with inert gas so as to collect only NF3 which was then quantitatively analyzed by gas chromatography. The amount of the NF3 gas refined is represented in cc per g of adsorbent used. The results according to the kind of zeolite 3A used are given in Table 1, below.

Comparative Example I

For comparison, the same procedure as in Example 1 was conducted using a typical zeolite 3A (manufactured by Aldrich. Inc., particle size 8~12 meshes, spherical), which was neither ion-exchanged nor impregnated with alkali earth metal. The results are given in Table 1, below.

TABLE 1

Adsorption Capacity of Zeolite 3A According to Kinds of Alkali Earth Metal ion exchanged and impregnated (Alkali Earth Metal ion-exchanged to Zeolite 3A: 50 wt %).

|  | Cmp. Ex. I | Number of Example I | | | |
|---|---|---|---|---|---|
|  |  | 1 | 2 | 3 | 4 |
| Metal Impregnated | — | Mg | Ca | Sr | Ba |
| ImpregnatedContent(wt %) | — | 1 | 1 | 1 | 1 |
| CF4 Content(ppm) | 22 | 191 | 245 | 311 | 191 |
| CF4 Removal(%) | 99.6 | 96.2 | 95.1 | 93.8 | 96.2 |
| adsorbed NF3 (cc/g) | 1.1 | 15.7 | 14.5 | 12.0 | 19.7 |

Example II

The same procedure as in Example I was conducted, except that zeolite 4A ion-exchanged and impregnated with the alkali earth metal in Preparation Examples 2 and 3 was used. The results are given in Table 2, below.

Comparative Example II

Using a typical zeolite 4A (manufactured by Aldrich. Inc., particle size 8~12 meshes, spherical), which was neither ion-exchanged nor impregnated with alkali earth metal, the same procedure as in Example I was repeated. The results are given in Table 2, below.

TABLE 2

Adsorption Capacity of Zeolite 4A According to Kinds and Concentration of Alkali Earth Metal ion exchanged and impregnated (Alkali Earth Metal ion-exchanged to Zeolite 4A: 50 wt %) (I)

|  | Cmp. Ex. II | Number of Example II | | | | | | | | | | | | | | | |
|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 | 16 |
| Metal Impregnated |  | Mg | | | | Ca | | | | Sr | | | | Ba | | | |
| Impregnated Content(wt %) | 0 | 0.1 | 0.5 | 1 | 1.5 | 0.1 | 0.5 | 1 | 1.5 | 0.1 | 0.5 | 1.0 | 1.5 | 0.1 | 0.5 | 1.0 | 1.5 |

TABLE 2-continued

Adsorption Capacity of Zeolite 4A According to Kinds and Concentration of Alkali Earth Metal ion exchanged and impregnated (Alkali Earth Metal ion-exchanged to Zeolite 4A: 50 wt %) (I)

|  | Cmp. Ex. II | \multicolumn{16}{c}{Number of Example II} |
|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 | 16 |
| $CF_4$ Content(ppm) | 22 | 258 | 221 | 197 | 291 | 285 | 272 | 241 | 366 | 261 | 255 | 242 | 312 | 210 | 191 | 181 | 124 |
| $CF_4$ Removal(%) | 99.6 | 94.8 | 95.6 | 96.1 | 94.2 | 94.3 | 94.6 | 95.2 | 92.7 | 94.8 | 94.9 | 95.2 | 93.8 | 95.8 | 96.2 | 96.4 | 97.5 |
| adsorbed $NF_3$ (cc/g) | 0.4 | 21.6 | 22.3 | 25.1 | 12.1 | 20.1 | 21.8 | 23.5 | 18.2 | 18.7 | 19.1 | 20.0 | 13.8 | 26.0 | 26.1 | 27.5 | 21.0 |

Example III

The same procedure as in Example I was conducted, with the exception of using the zeolite 4A ion-exchanged and impregnated with the alkali earth metal in Preparation Example 4. The results are given in Table 3, below.

TABLE 3

Adsorption Capacity of Zeolite 4A According to Kinds and Concentration of Alkali Earth Metal ion exchanged and impregnated (Alkali Earth Metal ion-exchanged to Zeolite 4A: 80 wt %) (II)

| | \multicolumn{16}{c}{Number of Example III} |
|---|---|---|---|---|---|---|---|---|---|---|---|---|---|---|---|---|
|  | 1 | 2 | 3 | 43 | 5 | 6 | 7 | 8 | 9 | 10 | 11 | 12 | 13 | 14 | 15 | 16 |
| Metal Impregnated | \multicolumn{4}{c}{Mg} | \multicolumn{4}{c}{Ca} | \multicolumn{4}{c}{Sr} | \multicolumn{4}{c}{Ba} |
| Impregnated Content(wt %) | 0.1 | 0.5 | 1 | 1.5 | 0.1 | 0.5 | 1 | 1.5 | 0.1 | 0.5 | 1.0 | 1.5 | 0.1 | 0.5 | 1.0 | 1.5 |
| $CF_4$ Content(ppm) | 294 | 253 | 227 | 330 | 313 | 309 | 248 | 411 | 291 | 280 | 244 | 371 | 240 | 221 | 209 | 184 |
| $CF_4$ Removal(%) | 94.1 | 94.9 | 95.5 | 93.4 | 93.7 | 93.8 | 95.0 | 91.8 | 94.2 | 94.4 | 95.1 | 92.6 | 95.2 | 95.6 | 95.8 | 96.3 |
| $NF_3$ adsorbed (cc/g) | 19.4 | 20.0 | 22.6 | 10.9 | 18.3 | 19.0 | 21.1 | 16.4 | 16.8 | 17.2 | 18.1 | 12.4 | 23.2 | 23.5 | 24.8 | 18.9 |

Example IV

The same procedure as in Example I was carried out, with the exception that the zeolite 5A ion-exchanged and impregnated with alkali earth metal in Preparation Examples 5 and 6 was used. The results are given in Table 4, below.

Comparative Example III

Using a typical zeolite 5A (manufactured by Aldrich. Inc., particle size 8~12 meshes, spherical), which was neither ion-exchanged nor impregnated with alkali earth metal, the same procedure as in Example I was repeated. The results are given in Table 4, below.

The zeolite 5A that was neither ion-exchanged nor impregnated with alkali earth metal was found to adsorb both $CF_4$ and $NF_3$ thereonto and thus be incapable of separating $NF_3$.

TABLE 4

Adsorption Capacity of Zeolite 5A According to Kinds and concentration of Alkali Earth Metal ion exchanged and impregnated (Alkali Earth Metal ion-exchanged to Zeolite 5A: 50 wt %) (I)

|  | Cmp. Ex. III | \multicolumn{16}{c}{Number of Example IV} |
|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 | 16 |
| Metal Impregnated |  | \multicolumn{4}{c}{Mg} | \multicolumn{4}{c}{Ca} | \multicolumn{4}{c}{Sr} | \multicolumn{4}{c}{Ba} |
| Impregnated Content(wt %) | 0 | 0.1 | 0.5 | 1 | 1.5 | 0.1 | 0.5 | 1 | 1.5 | 0.1 | 0.5 | 1.0 | 1.5 | 0.1 | 0.5 | 1.0 | 1.5 |
| $CF_4$ Content(ppm) | 3572 | 251 | 181 | 167 | 337 | 294 | 212 | 236 | 380 | 255 | 191 | 180 | 379 | 180 | 148 | 144 | 291 |

TABLE 4-continued

Adsorption Capacity of Zeolite 5A According to Kinds and concentration of Alkali Earth Metal ion exchanged and impregnated (Alkali Earth Metal ion-exchanged to Zeolite 5A: 50 wt %) (I)

| | Cmp. Ex. III | Number of Example IV | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| CF4 Removal(%) | 28.6 | 95.0 | 96.4 | 96.7 | 93.3 | 94.1 | 95.8 | 95.3 | 92.4 | 94.9 | 96.2 | 96.4 | 92.4 | 96.4 | 97.0 | 97.1 | 94.2 |
| adsorbed NF3 (cc/g) | 49.1 | 18.0 | 19.7 | 20.4 | 12.5 | 18.5 | 20.8 | 21.1 | 15.4 | 20.6 | 21.8 | 23.0 | 18.6 | 20.8 | 22.9 | 24.5 | 21.7 |

Example V

The same procedure as in Example I was carried out, with the exception that the zeolite 5A ion-exchanged and impregnated with alkali earth metal in Preparation Example 7 was used. The results are given in Table 5, below.

TABLE 5

Adsorption Capacity of Zeolite 5A According to Kinds and Concentration of Alkali Earth Metal ion exchanged and impregnated (Alkali Earth Metal ion-exchanged to Zeolite 5A: 80 wt %) (II)

| | Number of Example V | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Metal Impregnated | Mg | | | | Ca | | | | Sr | | | | Ba | | | |
| Impregnated Content(wt %) | 0.1 | 0.5 | 1 | 1.5 | 0.1 | 0.5 | 1 | 1.5 | 0.1 | 0.5 | 1.0 | 1.5 | 0.1 | 0.5 | 1.0 | 1.5 |
| CF4 Content(ppm) | 288 | 220 | 185 | 391 | 348 | 260 | 245 | 470 | 250 | 228 | 234 | 470 | 191 | 172 | 168 | 301 |
| CF4 Removal(%) | 94.2 | 95.6 | 96.3 | 92.2 | 93.0 | 94.8 | 95.1 | 90.6 | 95.0 | 95.4 | 95.3 | 90.6 | 96.2 | 96.6 | 96.6 | 94.0 |
| adsorbed NF3 (cc/g) | 16.7 | 17.9 | 18.7 | 12.0 | 16.8 | 18.9 | 19.0 | 13.9 | 18.6 | 19.7 | 20.8 | 16.7 | 18.9 | 20.4 | 22.0 | 19.1 |

Example VI

In order to produce NF3 of ultra-high purity, the NF3 gas containing CF4, obtained in Example II, was permeated again through a bed of the zeolite 4A ion-exchanged and impregnated with alkali earth metal. That is, the NF3 gas with a CF4 content of 226 ppm, produced through the primary refinement of Example II, was allowed to pass through a storage tank of liquid nitrogen to collect a predetermined amount of an inert gas-free NF3 gas containing a trace amount of CF4. Separately, the zeolite 4A prepared in Preparation Example 2 was filled up to a height of 400 mm in a stainless steel column having an inner diameter of 10 mm and cooled to −20° C. The NF3 gas with a CF4 content of 226 ppm, in a mixture of an equal volume of inert gas, was permeated through the bed of the zeolite 4A at a weight flow rate of 22.5 (g/cm²·hr) for a period of time (about 3 hours) sufficient to adsorb both NF3 and CF4 onto the bed. Thereafter, while the bed of the adsorbent was heated at an elevation rate of 1° C./min up to 400° C., the NF3 which was desorbed from the bed was quantitatively analyzed. Gas chromatography showed that CF4 was removed at a rate higher than 99.3% based on the content before the primary refinement. The results are given in Table 6, below.

TABLE 6

Result after Rwo Rounds of Adsorption (Zeolite 4A, 50 wt % ion-exchanged, 1 wt % Impregnated)

| | Nos. of Example VI | | | |
|---|---|---|---|---|
| | 1 | 2 | 3 | 4 |
| Metal Exchanged | Mg | Ca | Sr | Ba |
| Bed Temp. at Adsorption (° C.) | −20 | −20 | −20 | −20 |
| CF4 Content(ppm) | 23 | 17 | 16 | 20 |
| CF4 Removal(%) | 99.54 | 99.66 | 99.68 | 99.60 |
| adsorbed NF3 (cc/g) | 19.1 | 20.4 | 22.6 | 21.0 |

The invention claimed is:

1. A process for refining nitrogen trifluoride gas, comprising:
   introducing a gas mixture of nitrogen trifluoride (NF3) and carbon tetrafluoride (CF4) into a bed of zeolite 3A, 4A or 5A to selectively adsorb nitrogen trifluoride onto the bed, with the carbon tetrafluoride passing through the bed, said zeolite 3A, 4A or 5A being ion-exchanged and impregnated with alkali earth metal; and
   recovering the nitrogen trifluoride from the bed.

2. The process as defined in claim 1, wherein the zeolite contains the ion-exchanged alkali earth metal in an amount of 20 to 95% by weight based on the total weight of the metal within the zeolite and the impregnated alkali earth metal in an amount of 0.1 to 5% by weight based on the total weight of the zeolite.

3. The process as defined in claim 1, wherein the alkali earth metal is magnesium (Mg).

4. The process as defined in claim 1, wherein the alkali earth metal is calcium (Ca).

5. The process as defined in claim 1, wherein the alkali earth metal is strontium (Sr).

6. The process as defined in 1, wherein the alkali earth metal is barium (Ba).

7. The process as defined in claim 1, wherein the gas mixture of NF3 and CF4 is introduced into the bed at a temperature of −100 to 50.degree.C.

8. The process as defined in claim 1, wherein the gas mixture of NF3 and CF4 is introduced in combination with an inert gas into the bed, said inert gas amounting to 20 to 80 vol % based on the total volume of NF3, CF4 and the inert gas introduced.

9. The process as defined in claim 8, wherein the inert gas is selected from the group consisting of argon, helium and nitrogen.

10. The process as defined in claim 1, wherein the introducing step of adsorbing nitrogen trifluoride (NF3) onto the zeolite 3A, 4A or 5A ion-exchanged and impregnated with the alkali earth metal and recovering step of nitrogen trifluoride from the zeolite are sequentially repeated two or more times.

* * * * *